(12) United States Patent
Moteki et al.

(10) Patent No.: US 7,121,251 B2
(45) Date of Patent: Oct. 17, 2006

(54) MULTI-LINK PISTON CRANK MECHANISM FOR INTERNAL COMBUSTION ENGINE

(75) Inventors: Katsuya Moteki, Tokyo (JP); Masashi Imadu, Yokohama (JP); Naoki Takahashi, Yokohama (JP); Kenshi Ushijima, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/924,810

(22) Filed: Aug. 25, 2004

(65) Prior Publication Data

US 2005/0045120 A1 Mar. 3, 2005

(30) Foreign Application Priority Data

Aug. 28, 2003 (JP) ............................. 2003-209206

(51) Int. Cl.
*F02B 75/32* (2006.01)
*F02B 75/04* (2006.01)
(52) U.S. Cl. ................ 123/197.1; 123/48 B; 123/197.4
(58) Field of Classification Search .............. 123/48 B, 123/78 F, 197.1, 197.4
See application file for complete search history.

(56) References Cited

U.S. PATENT DOCUMENTS 2,540,882 A 2/1951 Hill
6,561,142 B1 5/2003 Moteki et al.
2002/0020368 A1* 2/2002 Fujimoto et al. .......... 123/48 B
2002/0026910 A1* 3/2002 Hiyoshi et al. ............ 123/48 B
2002/0144665 A1* 10/2002 Ushijima et al. .......... 123/48 B

FOREIGN PATENT DOCUMENTS

| EP | 1 215 380 A2 | 6/2002 |
| EP | 1 347 161 A2 | 9/2003 |
| EP | 1 431 617 A1 | 6/2004 |
| GB | 972654 | 10/1964 |
| JP | 2002-188455 A | 7/2002 |
| WO | WO 01/55606 A1 | 8/2001 |

* cited by examiner

Primary Examiner—Noah P. Kamen
(74) Attorney, Agent, or Firm—Foley & Lardner LLP

(57) ABSTRACT

A multi-link piston crank mechanism for an internal combustion engine, including a crankshaft having a crank pin, and crank webs connected with each other through the crank pin. A pair of thrust surfaces are formed on the crank webs so as to be opposed in a direction of a center axis of the crank pin. A first link pivotally supported on the crank pin is coupled to a second link through a connection pin located in a space between the thrust surfaces. The connection pin is moveable about the crank pin to form a circular trace along which the thrust surfaces extend. The end surfaces of the connection pin and the thrust surfaces come into mutual contact to prevent the connection pin from falling out of the space between the thrust surfaces.

4 Claims, 10 Drawing Sheets

MULTI-LINK PISTON CRANK MECHANISM FOR INTERNAL COMBUSTION ENGINE

BACKGROUND OF THE INVENTION

The present invention relates to a piston crank mechanism for reciprocating internal combustion engines having a crankshaft rotatable as a piston reciprocally moves. Specifically, the present invention relates to a multi-link piston crank mechanism in which a piston pin and a crank pin are connected with each other through a plurality of links.

Japanese Patent Application First Publication No. 2002-188455 (corresponding to U.S. Pat. No. 6,561,142) discloses a multi-link piston crank mechanism useable as a variable compression ratio mechanism for reciprocating internal combustion engines. The multi-link piston crank mechanism includes upper and lower links linking a piston pin of a piston to a crank pin of a crankshaft, and a control link linking the lower link to an engine block. The upper and lower links are connected with each other so as to be relatively pivotally moveable about a connection pin. The lower link is pivotally supported on the crank pin and connected to one end of the control link through a connection pin. The control link operates so as to restrain motion of the lower link. The control link has an opposed end swingably supported on the engine block, for instance, a lower portion of a cylinder block. The opposed end of the control link is coupled to a cam mechanism varying a position of the center of the swing motion of the opposed end. Owing to the operation of the cam mechanism, a top bottom center position of the piston and a compression ratio of the engine can be varied.

In view of lubricating performance in such a multi-link piston crank mechanism, it is preferred to use the connection pin of a full-floating type capable of connecting two links so as to permit relative pivotal motion thereof. In order to realize the full-floating connection construction of the connection pin, opposed end portions of the connection pin are projected outwardly from a pin boss of the link, and snap rings are mounted to snap ring grooves formed on the projected end portions of the connection pin. With the arrangement of the snap rings on the projected end portions of the connection pin, the connection pin can be prevented from removing from the link in the axial direction. The arrangement of the snap rings on the projected end portions of the connection pin is shown in FIG. 11 of the above-described related art.

SUMMARY OF THE INVENTION

In such a multi-link piston crank mechanism of the above-described related art, an axial length of the connection pin is increased, resulting in increase in total weight of the multi-link piston crank mechanism. This is undesirable because the respective links move at high speed. In addition, in a case where the connection pin has the projected end portions, a width of a crank web, namely, a thickness of the crank web in an axial direction of the crankshaft, assuming that an entire length of the crankshaft is constant, must be reduced to prevent interference therewith. This makes it difficult to ensure rigidity and strength of the crankshaft.

It is an object of the present invention to provide a multi-link piston crank mechanism for an internal combustion engine, capable of limiting axial displacement of a connection pin connecting a plurality of links, without using snap rings, and capable of reducing an axial length of the connection pin to a minimum without deteriorating rigidity and strength of a crankshaft.

In one aspect of the present invention, there is provided a multi-link piston crank mechanism for an internal combustion engine, comprising:
 a crankshaft including a crank pin and a pair of crank webs connected with each other through the crank pin;
 a pair of thrust surfaces formed on the crank webs so as to be opposed in a direction of a center axis of the crank pin;
 a first link pivotally supported on the crank pin;
 a second link coupled to the first link; and
 a connection pin located in a space between the thrust surfaces such that axial end surfaces of the connection pin are opposed to the thrust surfaces, the connection pin connecting the first link and the second link so as to permit relative pivotal motion of the first link and the second link, the connection pin being moveable about the crank pin to form a circular trace;
 wherein the thrust surfaces extend along the circular trace formed by the connection pin, and the end surfaces of the connection pin and the thrust surfaces come into mutual contact to prevent the connection pin from falling out of the space between the thrust surfaces.

DETAILED DESCRIPTION OF THE INVENTION

In the followings, embodiments of the present invention will be described with reference to the accompanying drawings. For ease of understanding, various directional terms, such as right, left, upper, lower, upward, downward and the like will be used in the following descriptions. Such terms are to be understood with respect to only drawing or drawings in which the corresponding part is illustrated.

Figure 1:
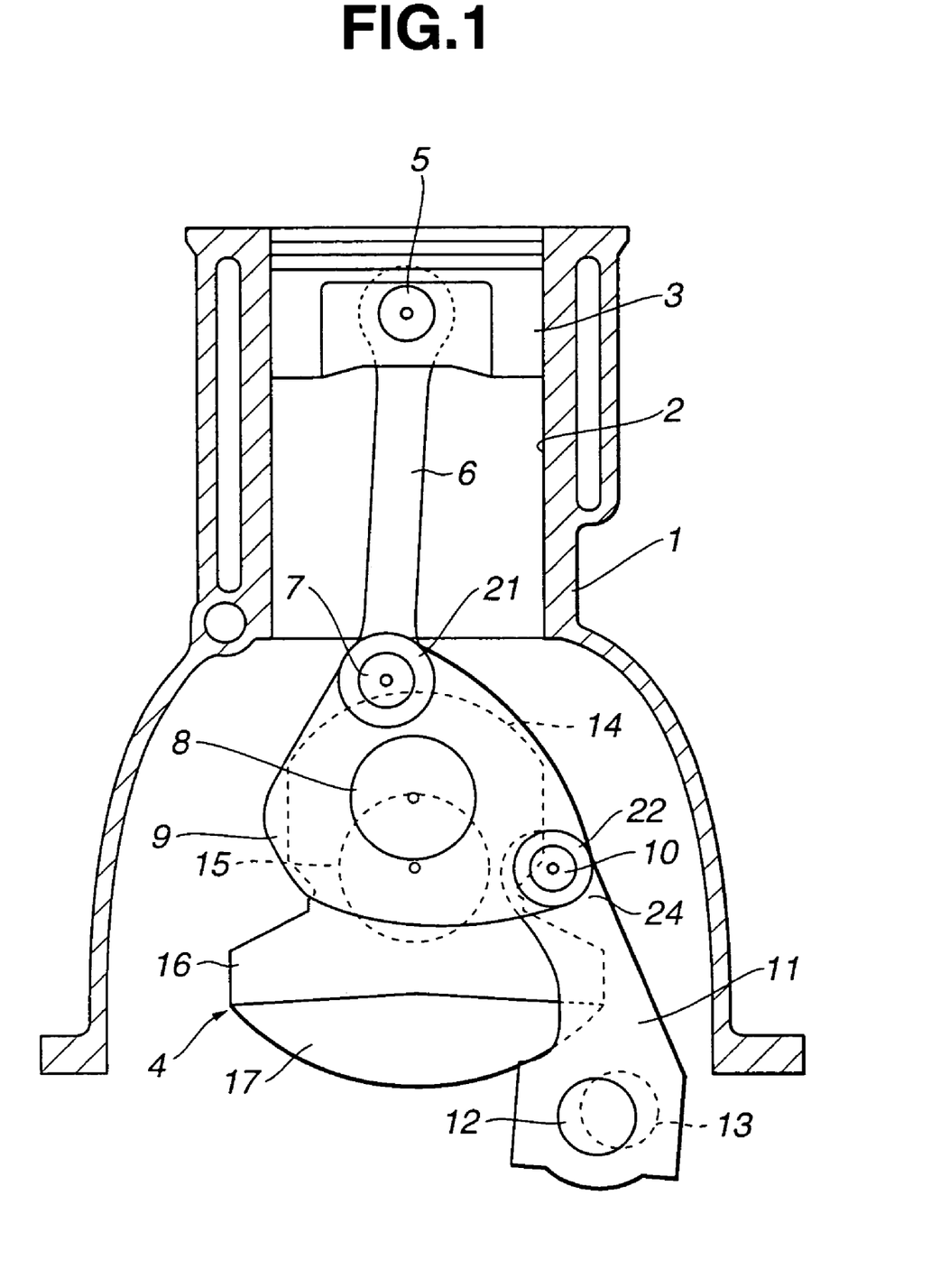
FIG. 1 is a cross section of an internal combustion engine including a multi-link piston crank mechanism of a first embodiment according to the present invention.
Figure 2:
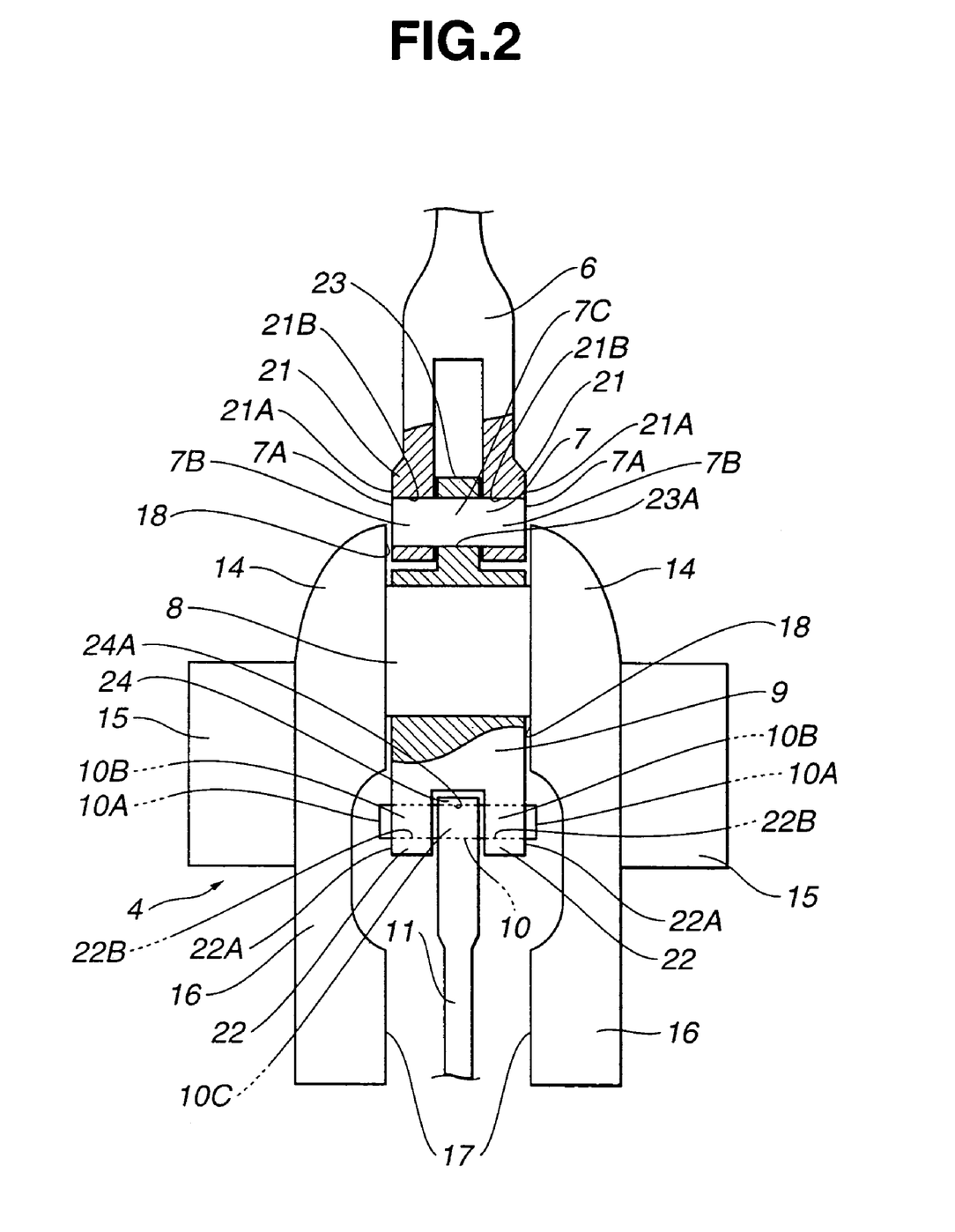
FIG. 2 is a side view of an essential part of the multi-link piston crank mechanism of the first embodiment.
Figure 3:
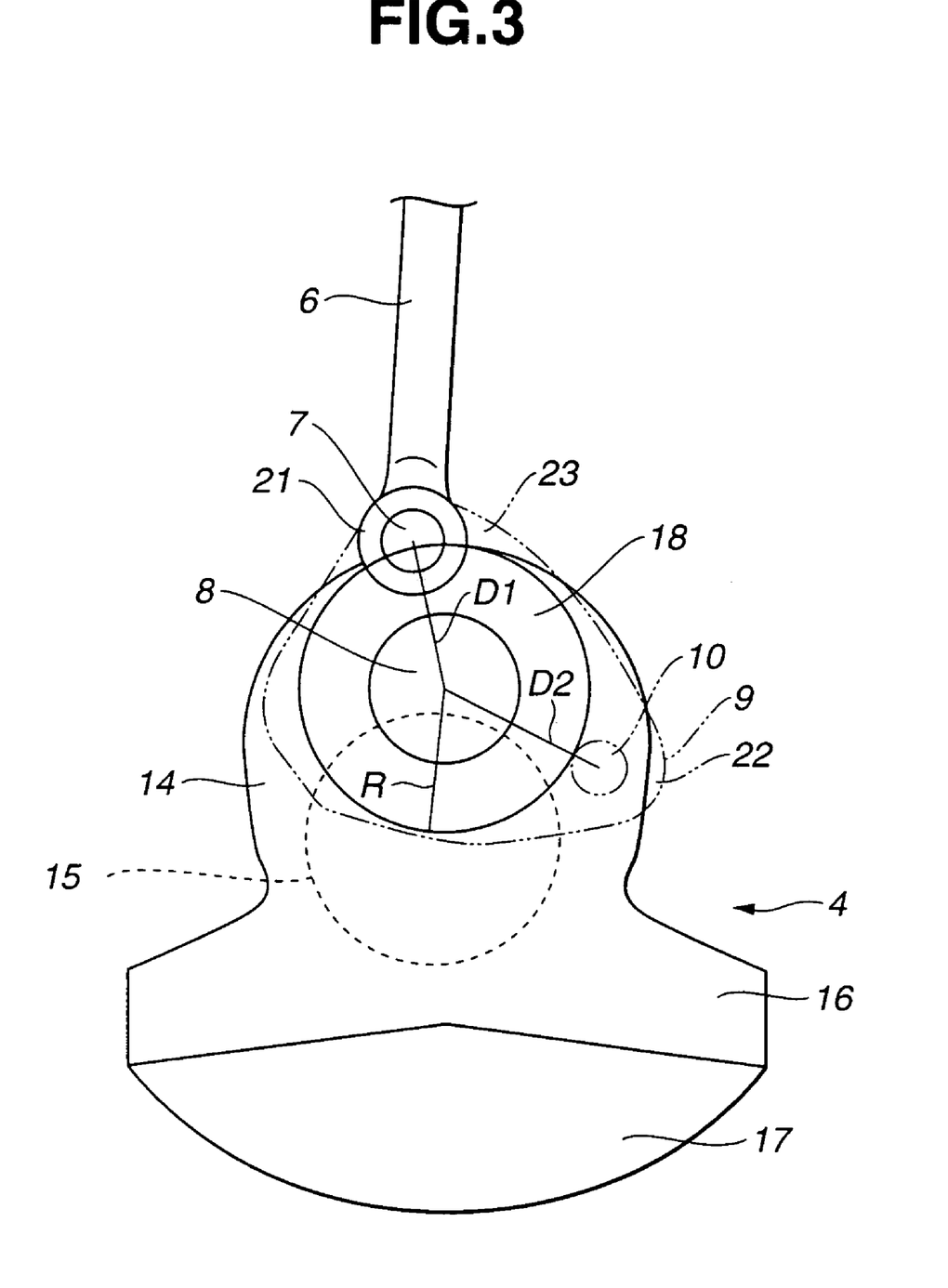
FIG. 3 is a cross section of the essential part of the multi-link piston crank mechanism of the first embodiment.

Referring to FIGS. 1–3, a multi-link piston crank mechanism of a first embodiment of the present invention is explained. As illustrated in FIG. 1, an internal combustion engine includes cylinder block 1. Cylinder block 1 has a plurality of engine cylinders 2, only one of which is shown in FIG. 1. Piston 3 is slidably disposed in engine cylinder 2. Crankshaft 4 is rotatably supported by cylinder block 1.

Upper link 6 extends downward from piston 3. Upper link 6 has an upper end portion connected to piston 3 through piston pin 5. Upper link 6 has a lower end portion pivotally connected to an outer peripheral portion of lower link 9 through connection pin 7 hereinafter referred to as upper pin 7. Lower link 9 has a central portion pivotally disposed on crank pin 8 of crankshaft 4, and an outer peripheral portion connected to an upper end portion of control link 11 through connection pin 10 hereinafter referred to as control pin 10. Lower link 9 thus has two connecting portions at the outer peripheral portions thereof which are connected to upper link 6 and control link 11 and circumferentially spaced from each other. Control link 11 has a lower end portion pivotally supported on the engine body through eccentric cam 12. A pivot of the pivotal motion of the lower end portion of control link 11 is controlled by eccentric cam 12 so as to be displaceable relative to the engine body. Eccentric cam 12 is integrally formed with control shaft 13 and has a center axis eccentric to a center axis of control shaft 13. Control shaft 13 continuously extends through the plurality of engine cylinders and is rotatably supported on cylinder block 1 of the engine through a support member, not shown.

Upper pin 7 and control pin 10 have a generally cylindrical shape and are mounted on respective links 6, 9 and 11 in the form of a full-floating connection. In this embodiment, control pin 10 is prevented from falling out of pin insertion holes of pin bosses of lower link 9 and a pin insertion hole of a pin boss of control link 11 by mean of snap rings, not shown.

As illustrated in FIG. 2, the lower end portion of upper link 6 is bifurcated to form two spaced pin bosses 21, 21. Pin bosses 21, 21 define pin insertion holes 21B, 21B, respectively. Pin insertion holes 21B, 21B extend through pin bosses 21, 21 and open into opposed axial end surfaces 21A, 21A of pin bosses 21, 21. Pin boss 23 of lower link 9 is interposed between pin bosses 21, 21 of upper link 6. Pin boss 23 is formed at one of the two connecting portions of lower link 9. Pin insertion hole 23A defined at pin boss 23 is in axial alignment with pin insertion holes 21B, 21B of pin bosses 21, 21. Upper pin 7 is rotatably and slidably fitted into pin insertion holes 21B, 21B of pin bosses 21, 21 and pin insertion hole 23A of pin boss 23. Upper pin 7 includes axially central portion 7C disposed within pin insertion hole 23A, and axially opposed end portions 7B disposed within pin insertion holes 21B, 21B. Upper pin 7 thus allows relative pivotal motion of upper link 6 and lower link 9.

The other of the two connecting portions of lower link 9 is bifurcated to form two spaced pin bosses 22, 22. Pin bosses 22, 22 define pin insertion holes 22B, 22B, respectively. Interposed between pin bosses 22, 22 is pin boss 24 of control link 11 which is formed at the one end portion of control link 11 and defines pin insertion hole 24A. Pin insertion hole 24A is in axial alignment with pin insertion holes 22B, 22B. Control pin 10 is rotatably and slidably fitted into pin insertion holes 22B, 22B of pin bosses 22, 22 and pin insertion hole 24A of pin boss 24. In this embodiment, the bifurcated lower end portion of upper link 6 has a thickness extending parallel to an axial direction of crank pin 8, namely, a distance between opposed axial end surfaces 21A, 21A of pin bosses 21, 21, which is equal to an entire length of upper pin 7. Accordingly, when upper pin 7 is located in an axially middle position as shown in FIG. 2, axial end surfaces 7A, 7A of upper pin 7 are axially aligned with axial end surfaces 21A, 21A of pin bosses 21, 21. Lower link 9 has a thickness extending in an axial direction of crank pin 8, which is equal to or slightly smaller than the entire length of upper pin 7. Further, as explained later, lower link 9 includes two parts that are separable on a split plane containing a center axis of crank pin 8, and coupled with each other to form an integral body by means of fastening members such as bolts.

Crankshaft 4 includes axially aligned crank journals 15, 15 connected with crank pin 8 through crank webs 14, 14. A pair of crank webs 14, 14 are axially opposed to each other, between which crank pin 8 extends. Crank webs 14, 14 have counterweights 16, respectively, which extend toward a radially opposite side of crank pin 8. Counterweights 16, 16 are formed into a generally sectoral shape as shown in FIG. 1. Counterweights 16, 16 have axial projections 17, 17 projecting from axially opposed surfaces thereof, respectively.

Annular thrust surfaces 18 are formed on axially opposed surfaces of crank webs 14 so as to be opposed to each other in the axial direction of crank pin 8. Each of thrust surfaces 18 is formed into a precise plane extending perpendicular to a center axis of crankshaft 4 by grinding or machining, and has sufficient wear resistance imparted by surface treatment. Upper pin 7 is interposed between thrust surfaces 18, 18. Specifically, upper pin 7 is located in an axial space defined by thrust surfaces 18, 18 such that axial end surfaces 7A, 7A of upper pin 7 are opposed to thrust surfaces 18, 18 with a slight clearance therebetween. A distance between thrust surfaces 18, 18 is set slightly larger than the entire length of upper pin 7.

As illustrated in FIG. 3, thrust surfaces 18, 18 of crank webs 14, 14 are positioned corresponding to a circular trace that is formed by upper pin 7 around the center axis of crank pin 8. Namely, each of thrust surfaces 18, 18 extends along the circular trace of upper pin 7 which is centered at the center axis of crank pin 8. In this embodiment, maximum radius R of thrust surface 18 is smaller than radial distance D1 between the center axis of crank pin 8 and a center axis of upper pin 7. Owing to the dimensional relationship between maximum radius R and radial distance D1, thrust surfaces 18, 18 and end surfaces 7A, 7A of upper pin 7 partially overlap one another in the axial direction.

Further, radial distance D1 between the center axis of crank pin 8 and the center axis of upper pin 7 is smaller than radial distance D2 between the center axis of crank pin 8 and a center axis of control pin 10. Namely, control pin 10 is located outside of upper pin 7 in the radial direction of crank pin 8. This arrangement of upper pin 7 and control pin 10 serves for reducing maximum acceleration of piston 3 in reciprocating motion and for suppressing occurrence of noise and vibration of the engine.

In the multi-link piston crank mechanism as described above, upper pin 7 is interposed between thrust surfaces 18, 18 of crank webs 14, 14 such that both end surfaces 7A, 7A of upper pin 7 are opposed to thrust surfaces 18, 18 with the slight clearance therebetween in axially overlapping relation thereto. When upper pin 7 axially moves during an operation of the engine, either one of end surfaces 7A, 7A of upper pin 7 comes into contact with the corresponding thrust surface 18. Axial displacement of upper pin 7 can be limited by the mutual contact between end surface 7A of upper pin 7 and the corresponding thrust surface 18. Upper pin 7, therefore, can be prevented from falling out of the space between thrust surfaces 18 and falling out of pin insertion holes 21B, 21B of pin bosses 21, 21 of upper link 6 and pin insertion hole 23A of pin boss 23 of lower link 9. Accordingly, a fastening member such as a snap ring can be omitted. Further, a whole circumferential surface of upper pin 7 which extends over the entire length of upper pin 7 can be effectively used as a slide surface, i.e., a bearing surface, which is brought into contact with inner circumferential surfaces of pin bosses 21, 21 and 23 which define pin insertion holes 21B, 21B and 23, respectively.

Further, lower link 9 is pivotally moved about control pin 10 during the rotational movement of crankshaft 4. This allows upper link 6 and lower link 9 to swing relative to each other. The relative swing movement of upper link 6 and lower link 9 about upper pin 7 is reciprocal swing movement thereof. During the reciprocal swing movement, there exists a moment at which a relative slide speed of upper pin 7 and upper link 6 and a relative slide speed of upper pin 7 and lower link 9 become zero. In other words, there exists a moment at which a direction of the reciprocal movement turns to reverse. At the moment, wedge effect of an oil film which acts on formation of the oil film on a bearing surface disappears. This tends to cause deterioration in lubrication on the bearing surface. In this embodiment, thrust surface 18 comes into contact with only a part of end surface 7A of upper pin 7 which is a peripheral area located on the side close to crank pin 8 rather than close to its center axis. This permits upper pin 7 to continuously rotate in pin insertion holes 21B, 21B and 23. Accordingly, the possibility of lacking the oil film between upper pin 7 and pin insertion holes 21B, 21B and 23 can be considerably reduced, and good lubrication between upper pin 7 and pin insertion holes 21B, 21B and 23 can be maintained.

Figure 4A:
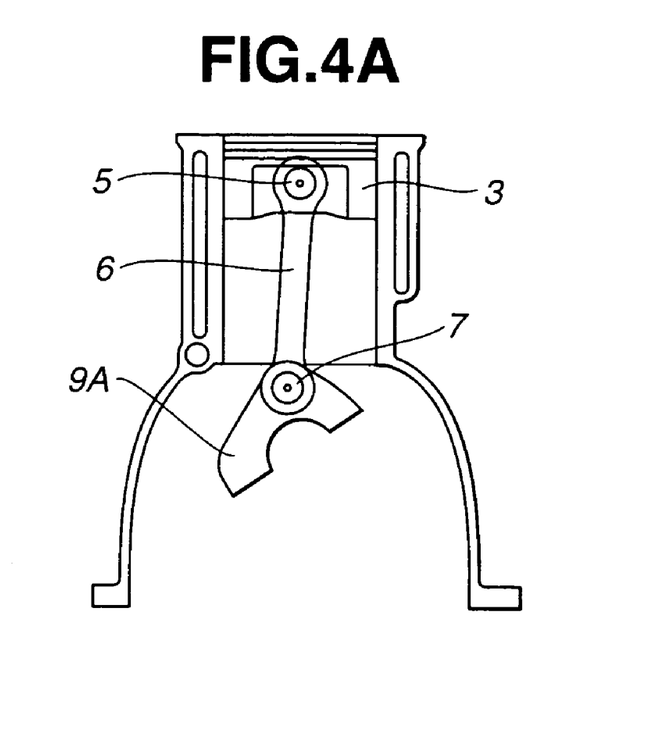
FIGS. 4A–4D are explanatory diagrams showing an operation of assembling the multi-link piston crank mechanism of the first embodiment.
Figure 4B:
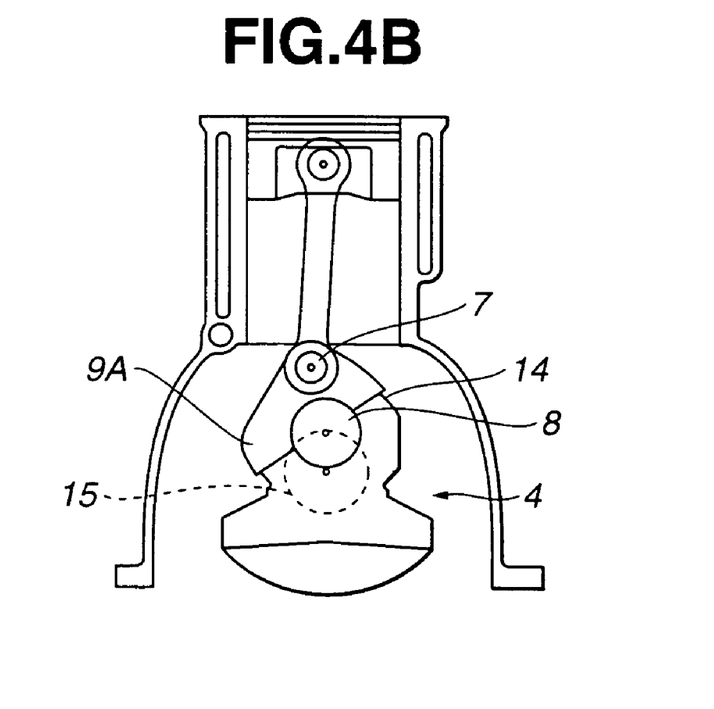

Referring to FIGS. 4A–4D, an operation of assembling the multi-link piston crank mechanism of the first embodiment will be explained hereinafter. As described above, lower link 9 is constituted of the two parts, namely, one link part 9A and the other link part 9B. Link parts 9A and 9B are separable from each other on the split plane that contains the center axis of crank pin 8 when fitted on crank pin 8. First, as illustrated in FIG. 4A, piston 3, piston pin 5, upper link 6, upper pin 7 and one link part 9A of lower link 9 are coupled together. At this time, upper link 6 and one link part 9A are coupled to each other by merely inserting upper pin 7 into pin insertion holes 21B, 21B of upper link 6 and pin insertion hole 23A of one link part 9A. Subsequently, as shown in FIG. 4B, one link part 9A is placed on crank pin 8 while keeping the coupling state of piston 3, piston pin 5, upper link 6, upper pin 7 and one link part 9A. In this state, upper pin 7 is interposed between the pair of thrust surfaces 18, 18 of crank webs 14, 14. Axial displacement of upper pin 7 is limited by the mutual contact between end surfaces 7A, 7A of upper pin 7 and thrust surfaces 18, 18, so that upper pin 7 is prevented from falling out of pin insertion holes 21B, 21B of upper link 6 and pin insertion hole 23A of one link part 9A.

Figure 4C:
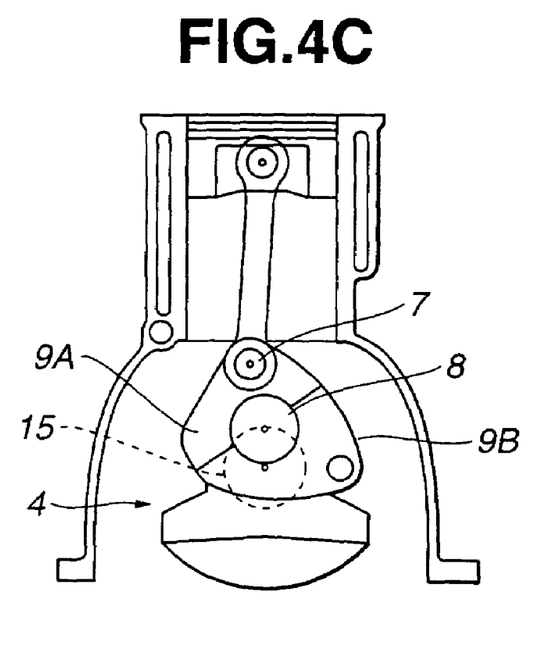
Figure 4D:
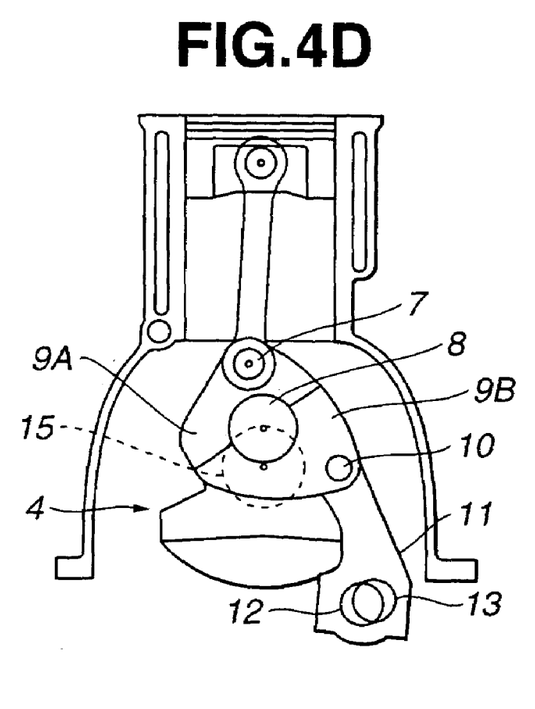

Next, as illustrated in FIG. 4C, the other link part 9B of lower link 9 is fixedly coupled to one link part 9A by means of fastening bolts. Thus, lower link 9 is assembled to crank pin 8. Subsequently, as illustrated in FIG. 4D, control link 11 is coupled to lower link 9 using control pin 10. Control pin 10 is prevented from falling out of pin insertion holes 22B, 22B of the other link part 9B and pin insertion hole 24A of control link 11 by snap rings, not shown. Control shaft 13 with eccentric cam 12 is mounted to control link 11. Thus, a link train of the multi-link piston crank mechanism of the first embodiment can be assembled.

Figure 5:
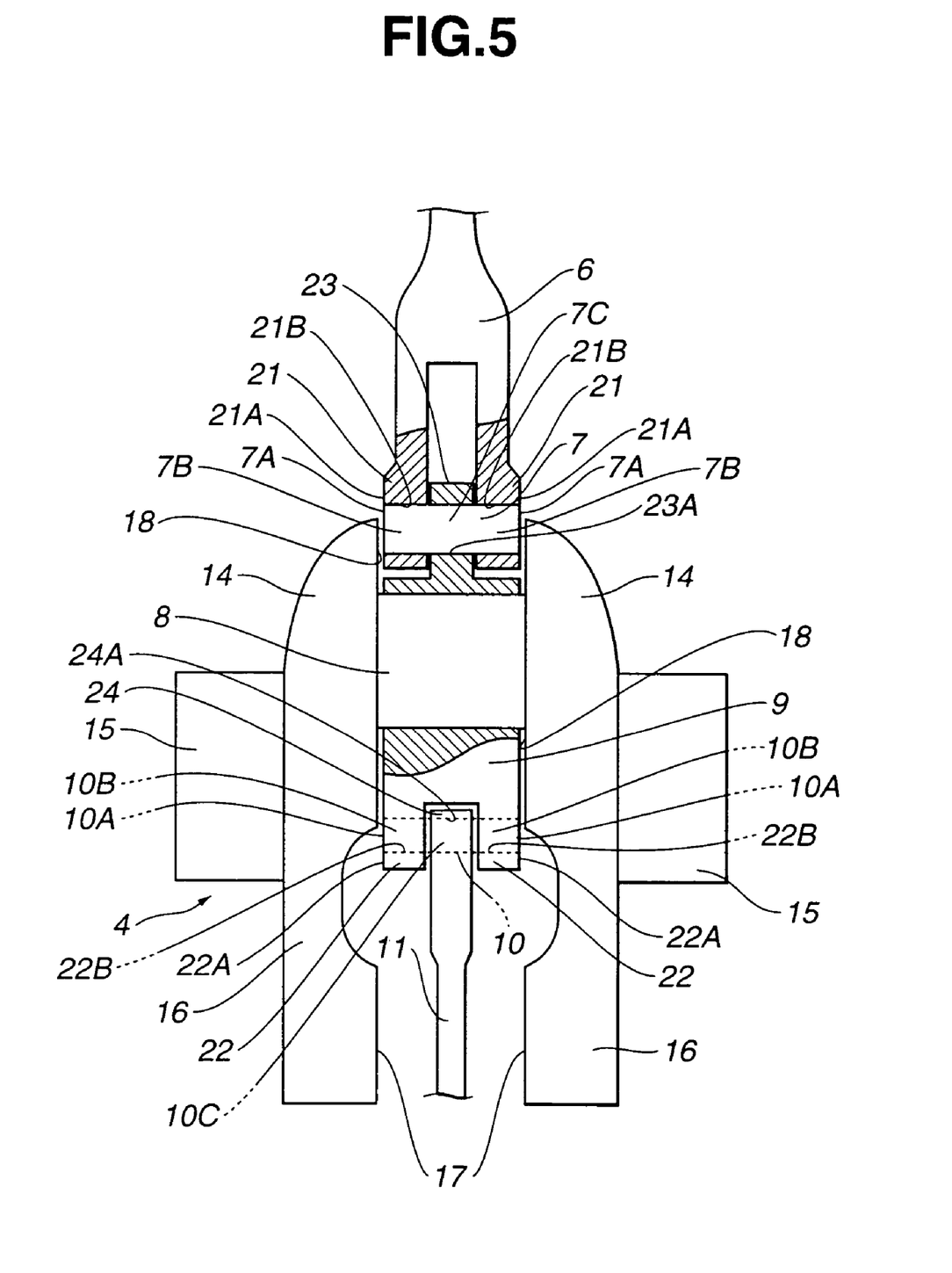
FIG. 5 is a side view of an essential part of the multi-link piston crank mechanism of a second embodiment.
Figure 6:
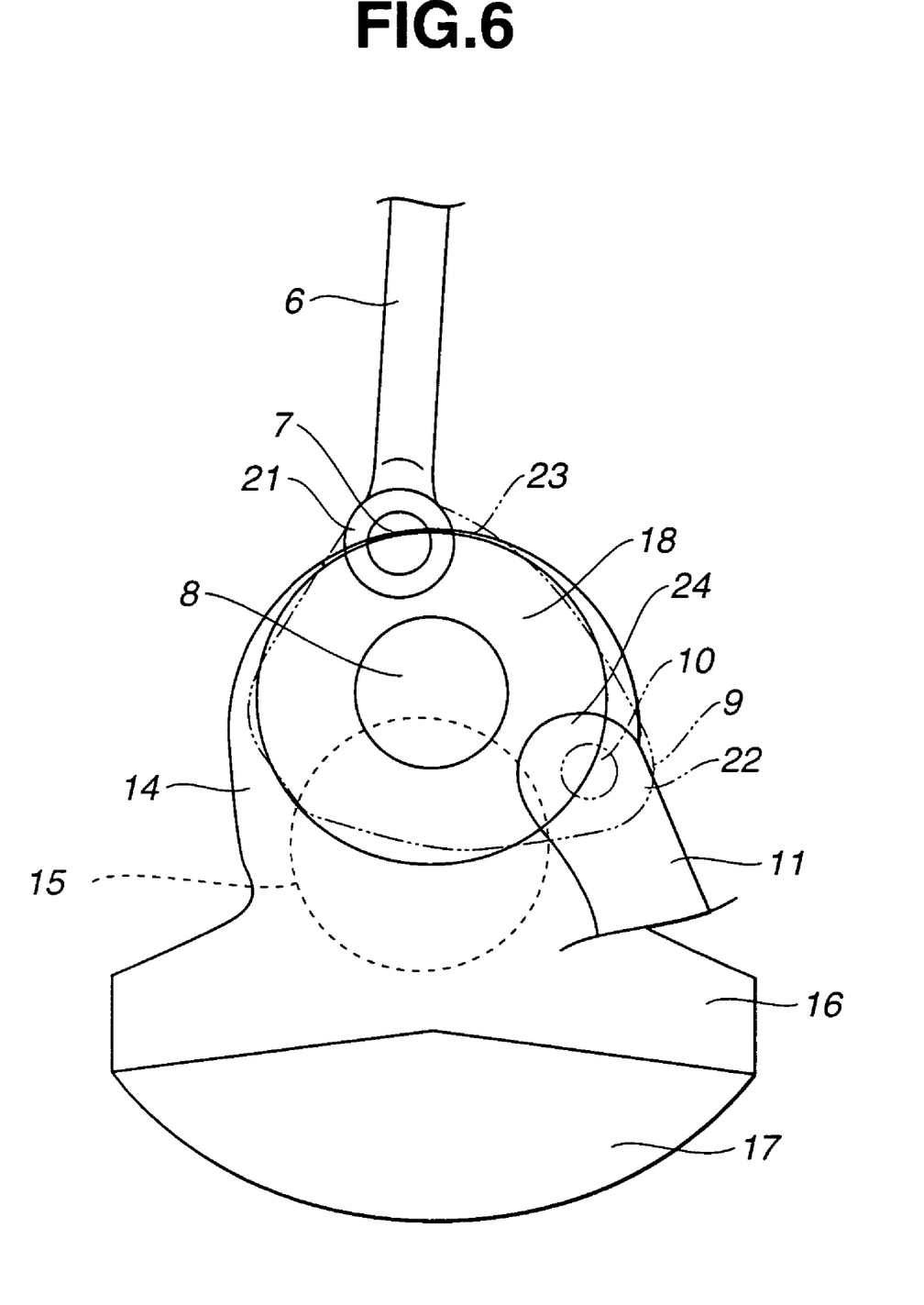
FIG. 6 is a cross section of the essential part of the multi-link piston crank mechanism of the second embodiment.

Referring to FIGS. 5 and 6, a second embodiment of the multi-link piston crank mechanism of the present invention is explained. Like reference numerals denote like parts, and therefore, detailed explanations therefor are omitted. In the second embodiment, the position of control pin 10 and the maximum radius of thrust surfaces 18, 18 of crank webs 14, 14 are determined such that end surfaces 10A, 10A of control pin 10 and thrust surfaces 18, 18 partially overlap one another. As illustrated in FIG. 5, control pin 10 is located in the space between thrust surfaces 18, 18 of crank webs 14, 14. A part of each of end surfaces 10A, 10A of control pin 10 is axially opposed to each of thrust surfaces 18, 18 with a slight clearance therebetween. Maximum radius R of thrust surface 18 is smaller than radial distance D2 between the center axis of crank pin 8 and the center axis of control pin 10. When one of end surfaces 10A, 10A of control pin 10 is brought into contact with the corresponding thrust surface 18, axial displacement of control pin 10 can be limited by the mutual contact between the one of end surface 10A and the corresponding thrust surface 18. Thus, control pin 10 can be prevented from falling out of the space between thrust surfaces 18, 18, namely, control pin 10 can be restrained from falling out of pin insertion holes 22B, 22B of lower link 9 and pin insertion hole 24A of control link 11. Radial distance D1 between the center axis of crank pin 8 and the center axis of upper pin 7 may be smaller than radial distance D2 between the center axis of crank pin 8 and the center axis of control pin 10. Control pin 10 has a generally cylindrical shape and is rotatably and slidably fitted to pin insertion holes 22B, 22B of lower link 9 and pin insertion hole 24A of control link 11. Control pin 10 has such an axial length that end surfaces 10A, 10A thereof are axially aligned with axial end surfaces 22A, 22A of pin bosses 22, 22 of lower link 9. With the arrangement of this embodiment, fastening members, such as snap rings, for preventing control pin 10 from falling out of corresponding pin insertion holes 22B, 22B and 24A can be omitted. Further, similar to upper pin 7, the whole circumferential surface of control pin 10 can be effectively used as a bearing surface relative to the inner circumferential surfaces of pin bosses 22, 22 of lower link 9 and the inner circumferential surface of pin boss 24 of control link 11.

Figure 7A:
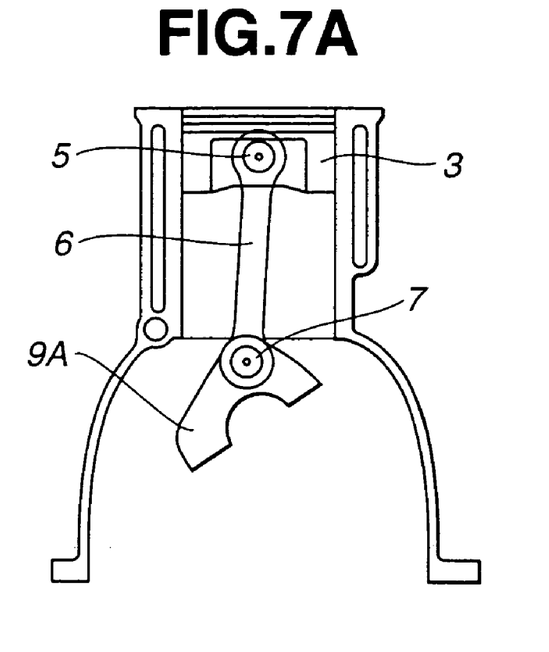
FIGS. 7A–7D are explanatory diagrams showing an operation of assembling the multi-link piston crank mechanism of the second embodiment.
Figure 7B:
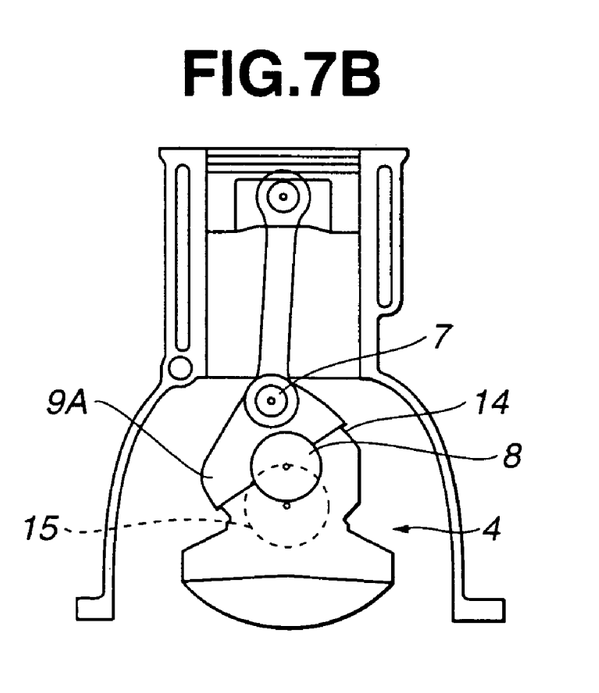

Referring to FIGS. 7A–7D, an operation of assembling the multi-link piston crank mechanism of the second embodiment will be explained hereinafter. First, as illustrated in FIG. 7A, piston 3, piston pin 5, upper link 6, upper pin 7 and one link part 9A of lower link 9 are coupled together. At this time, upper link 6 and one link part 9A are coupled to each other by merely inserting upper pin 7 into pin insertion holes 21B, 21B of upper link 6 and pin insertion hole 23A of one link part 9A. Subsequently, as shown in FIG. 7B, one link part 9A is placed on crank pin 8 while keeping the coupling state of piston 3, piston pin 5, upper link 6, upper pin 7 and one link part 9A. In this state, upper pin 7 is interposed between the pair of thrust surfaces 18, 18 of crank webs 14, 14. Axial displacement of upper pin 7 is thus limited by the mutual contact between end surfaces 7A, 7A and thrust surfaces 18, 18. Upper pin 7 is prevented from falling out of the space between thrust surfaces 18, 18, namely, prevented from falling out of pin insertion holes 21B, 21B of upper link 6 and pin insertion hole 23A of one link part 9A.

Figure 7C:
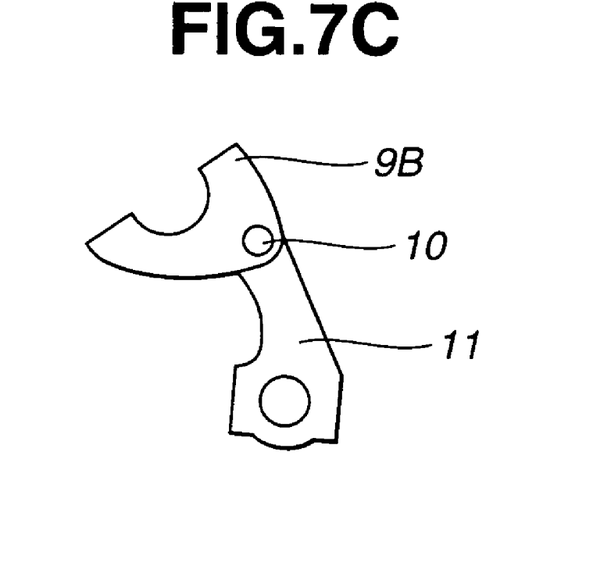
Figure 7D:
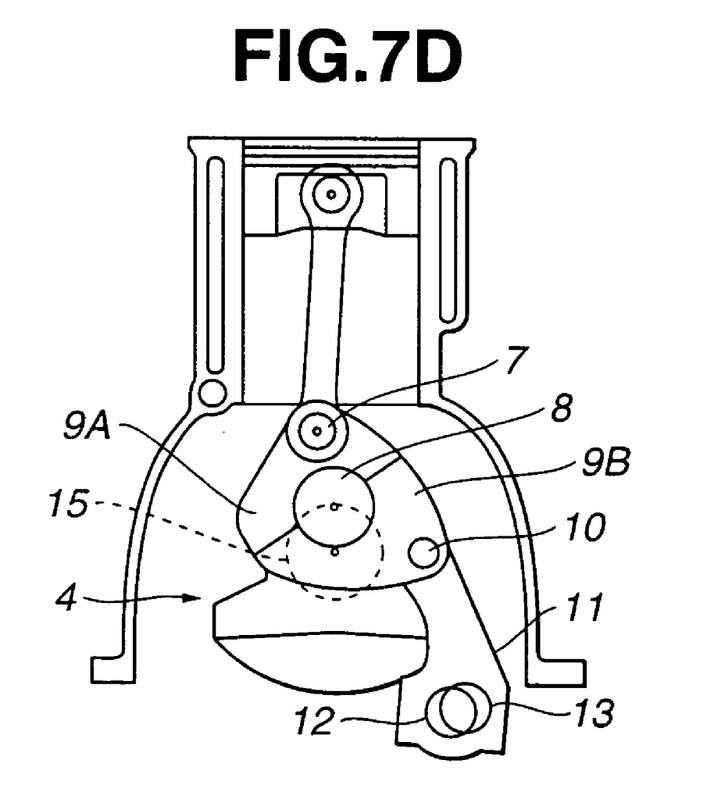

On the other hand, as illustrated in FIG. 7C, control link 11 is connected to the other link part 9B of lower link 9 by merely inserting control pin 10 into pin insertion holes 22B, 22B of the other link part 9B and pin insertion hole 24A of control link 11. Next, as illustrated in FIG. 7D, the other link part 9B connected with control link 11 is coupled to one link part 9A such that crank pin 8 is interposed between link parts 9A and 9B. Then, one link part 9A and the other link part 9B are joined together by means of fastening bolts. Thus, lower link 9 is assembled to crank pin 8. In this state, control pin 10 is interposed between thrust surfaces 18, 18 to thereby be prevented from falling out of the space between thrust surfaces 18, 18, namely, prevented from falling out of pin insertion holes 22B, 22B of the other link part 9B and pin insertion hole 24A of control link 11. Control shaft 13 with eccentric cam 12 is mounted to control link 11. Thus, a link train of the multi-link piston crank mechanism of the second embodiment can be assembled.

Figure 8:
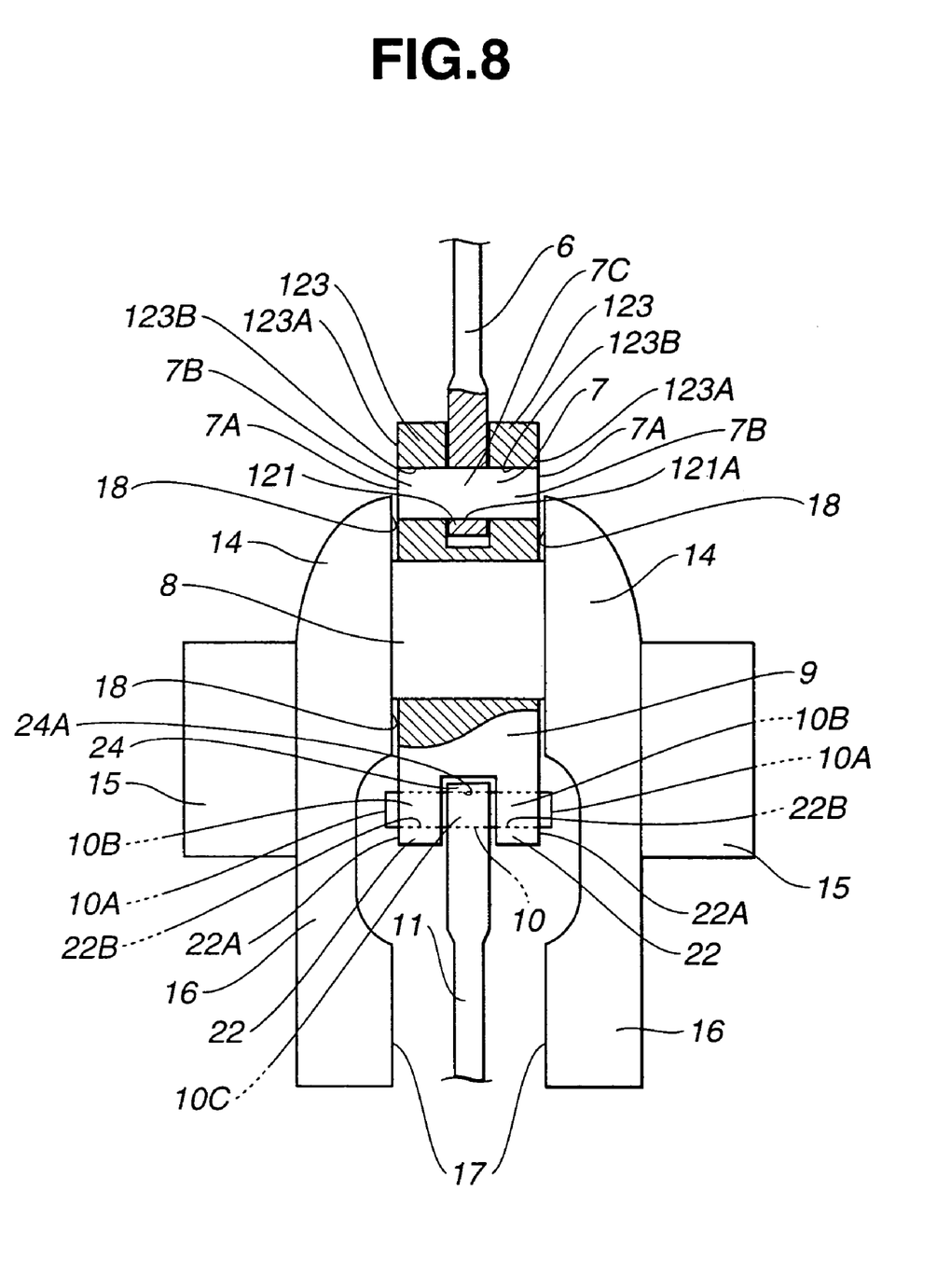
FIG. 8 is a side view of an essential part of the multi-link piston crank mechanism of a third embodiment.

Referring to FIG. 8, a third embodiment of the multi-link piston crank mechanism of the present invention is now explained. As illustrated in FIG. 8, the connecting portion of lower link 9 which is connected with upper link 6 is bifurcated to form two pin bosses 123, 123. Pin bosses 123, 123 define pin insertion holes 123B, 123B, respectively. Disposed between pin bosses 123, 123 is pin boss 121 of upper link 6 which defines pin insertion hole 121A. Pin insertion hole 121A is in axial alignment with pin insertion holes 123B, 123B. Upper pin 7 is rotatably and slidably fitted to pin insertion holes 123B, 123B and 121A. When upper pin 7 is located in an axially middle position as shown in FIG. 8, opposed end surfaces 7A, 7A of upper pin 7 are axially aligned with axial end surfaces 123A, 123A of pin bosses 123, 123. In this embodiment, axially central portion 7C of upper pin 7 disposed within pin insertion hole 121A of pin boss 121 of upper link 6, and axially opposed end portions 7B thereof are disposed within pin insertion holes 123B, 123B of pin bosses 123, 123 of lower link 9. With the arrangement of pin boss 121 of upper link 6, upper link 6 can be reduced in weight so that inertia force of upper link 6 can be reduced. Further, similar to the first embodiment, upper pin 7 is interposed between thrust surfaces 18, 18 of crank webs 14, 14 such that both end surfaces 7A, 7A of upper pin 7 are opposed to thrust surfaces 18, 18 with a slight clearance therebetween in axially overlapping relation thereto. Accordingly, in the third embodiment, the same effects as described in the first embodiment can be achieved.

As be understood from the above description, in the multi-link piston crank mechanism of the present invention, a connection pin connecting a plurality of links can be prevented from falling out of the space between thrust surfaces of crank webs, owing to mutual contact between end surfaces of the connection pin and the thrust surfaces. The connection pin can be thus prevented from falling out of the pin insertion holes of the respective links. Further, a full-floating pin connection can be attained without using fastening members such as snap rings on both end portions of the connection pin. Therefore, the entire length of the connection pin can be reduced to minimum without decreasing a contact area of the circumferential surface of the connection pin in which the connection pin is contacted with the inner circumferential surface of the pin bosses of the links. This results in reducing a total weight of the respective links and the connection pin, and therefore, reducing inertia force thereof. Further, within a limited entire length of the crankshaft, both a thickness of the crank webs and the contact area of the connection pin relative to the pin bosses of the links can be sufficiently provided.

This application is based on a prior Japanese Patent Application No. 2003-209206 filed on Aug. 28, 2003. The entire contents of the Japanese Patent Application No. 2003-209206 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A multi-link piston crank mechanism for an internal combustion engine, comprising:
   a crankshaft including a crank pin and a pair of crank webs connected with each other through the crank pin;
   a pair of thrust surfaces formed on the crank webs so as to be opposed in a direction of a center axis of the crank pin;
   a first link pivotally supported on the crank pin;
   a second link coupled to the first link; and
   a connection pin located in a space between the thrust surfaces such that axial end surfaces of the connection pin are opposed to the thrust surfaces, the connection pin connecting the first link and the second link so as to permit relative pivotal motion of the first link and the second link, the connection pin being moveable about the crank pin to form a circular trace,
   wherein the thrust surfaces extend along the circular trace formed by the connection pin, and the end surfaces of the connection pin and the thrust surfaces come into mutual contact to prevent the connection pin from falling out of the space between the thrust surfaces; and
   wherein the connection pin includes an axially central portion slidably disposed within a pin insertion hole formed in the first link, and axially opposed end portions slidably disposed within pin insertion holes formed in the second link.

2. The multi-link piston crank mechanism as claimed in claim 1, wherein the first link comprises an end portion forming a pin boss that defines the pin insertion hole, and the second link comprises a bifurcated end portion forming pin bosses that define the pin insertion holes.

3. The multi-link piston crank mechanism as claimed in claim 2, wherein the pin bosses of the second link have axial end surfaces aligned with the end surfaces of the connection pin.

4. A multi-link piston crank mechanism, for an internal combustion engine, comprising:
   a crankshaft including a crank pin and a pair of crank webs connected with each other through the crank pin;
   a pair of thrust surfaces formed on the crank webs so as to be opposed in a direction of a center axis of the crank pin;
   a first link pivotally supported on the crank pin;
   a second link coupled to the first link; and
   a connection pin located in a space between the thrust surfaces such that axial end surfaces of the connection pin are opposed to the thrust surfaces, the connection pin connecting the first link and the second link so as to permit relative pivotal motion of the first link and the second link, the connection pin being moveable about the crank pin to form a circular trace,
   wherein the thrust surfaces extend along the circular trace formed by the connection pin, and the end surfaces of the connection pin and the thrust surfaces come into mutual contact to prevent the connection pin from falling out of the space between the thrust surfaces;
   wherein the first link comprises two parts separated on a split plane containing the center axis of the crank pin, the two parts being coupled with each other to form the first link;
   wherein the two parts include pin bosses, respectively, that define the pin insertion holes, and the second link comprises an end portion forming a pin boss that defines the pin insertion hole; and
   wherein the pin bosses of the first link have axial end surfaces aligned with the end surfaces of the connection pin.

* * * * *